Sept. 4, 1951 L. H. ZEUN 2,566,712
MACHINE FOR DEPOSITING NUTS ON CANDY BARS
Filed Dec. 15, 1948 3 Sheets-Sheet 1

INVENTOR.
LOUIS H. ZEUN
BY
ATTORNEY

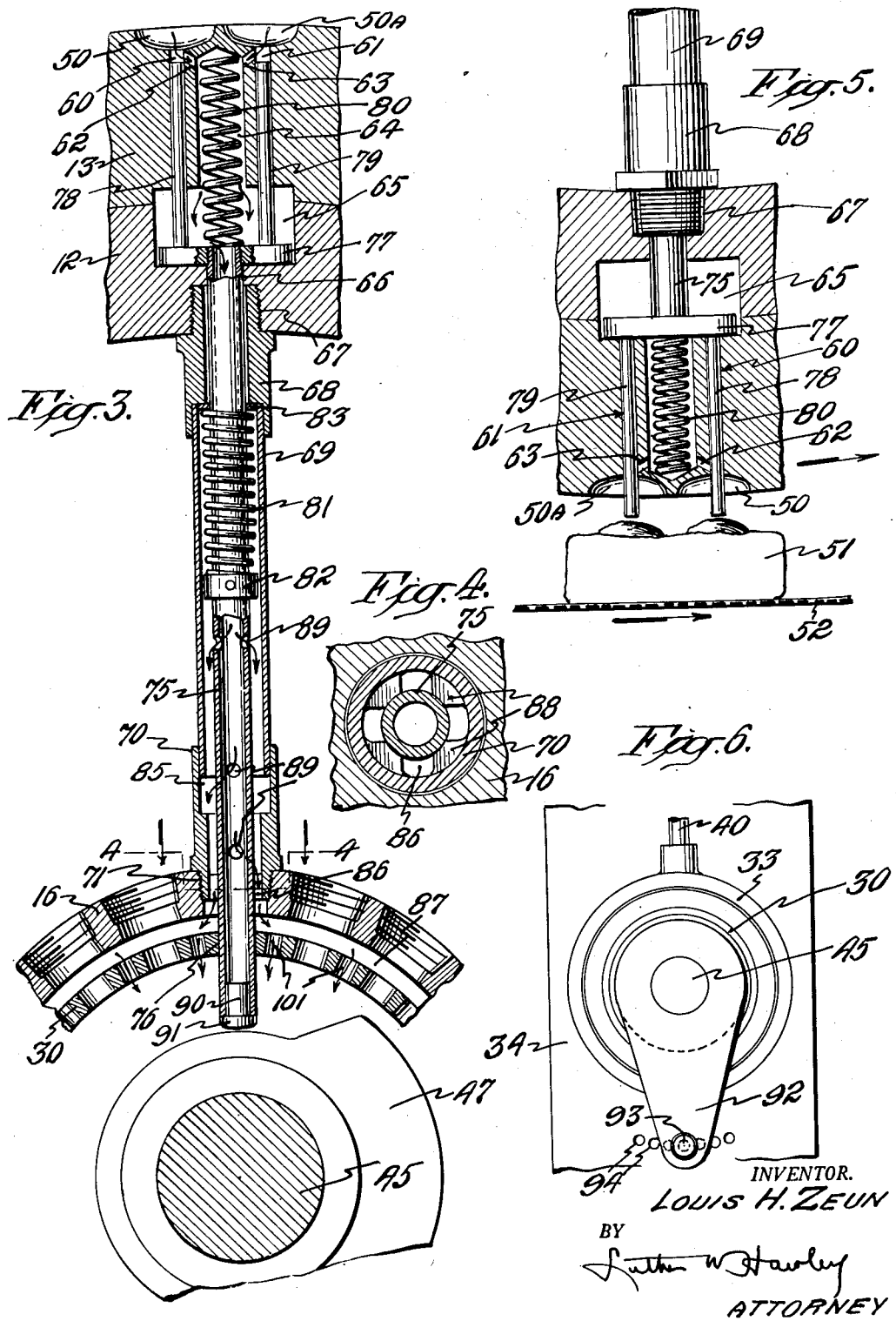

Patented Sept. 4, 1951

2,566,712

UNITED STATES PATENT OFFICE 2,566,712

MACHINE FOR DEPOSITING NUTS ON CANDY BARS

Louis H. Zeun, Naugatuck, Conn., assignor to Peter Paul, Inc., Naugatuck, Conn., a corporation of Delaware Application December 15, 1948, Serial No. 65,360

8 Claims. (Cl. 107—7)

This invention relates to a machine for depositing and positioning nuts on candy bars.

At the present time a candy bar is being marketed with nuts on the top of the bar. The nuts are usually placed on the bar by hand, thus involving a considerable labor cost.

This invention has for its salient object to provide a simple and practical machine for efficiently and accurately positioning nuts on candy bars.

Another object of the invention is to provide efficient means of the character described for accurately and securely positioning nuts on candy bars during the movement of the bars through the machine.

Further objects of the invention will appear from the following specification taken in connection with the drawings which form a part of this application, and in which:

Fig. 3 is an enlarged sectional elevation of one unit of the operating mechanism for receiving and depositing the nuts;

Fig. 4 is an enlarged sectional elevation taken substantially on line 4—4 of Fig. 3, looking in the direction of the arrows;

Fig. 5 is an enlarged sectional elevation of a portion of the drum periphery and showing the nut control mechanism in discharging position; and Fig. 6 is an elevational view, looking at the right hand end of Fig. 1, and showing the cam adjusting means.

Figure 1:
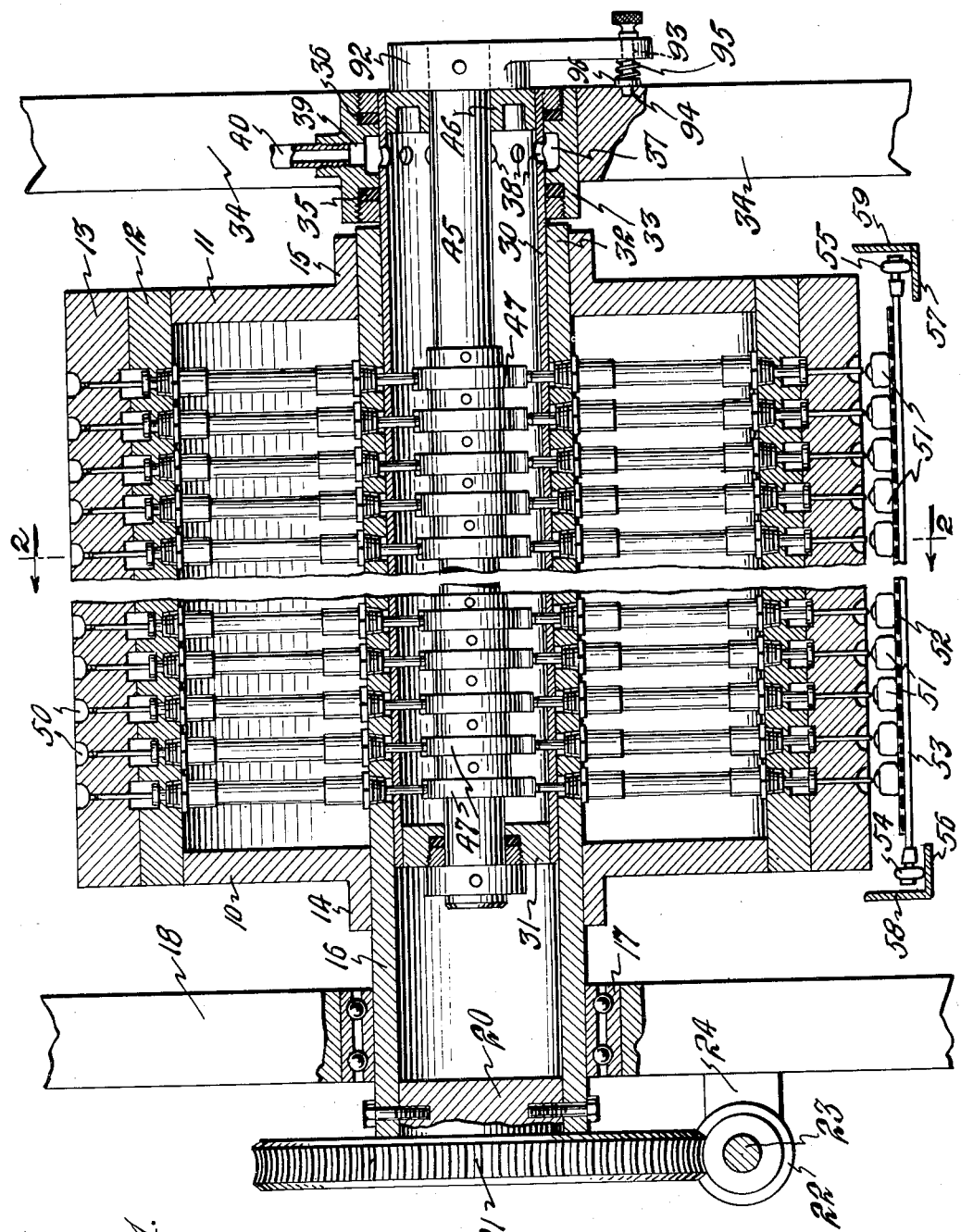
Fig. 1 is a longitudinal sectional elevation of a machine constructed in accordance with the invention.

The invention briefly described consists of a rotary carrier adapted to receive nuts from a hopper and having a plurality of annularly arranged peripheral pockets for receiving nuts from the hopper. Vacuum means is provided for holding the nuts in the pockets as they are carried from the hopper to discharging position and when the pockets and nuts reach this position the vacuum or suction is cut off from the pockets and the nuts are positively discharged on the candy bars.

Further details of the invention will appear from the following description.

In the particular form of the invention illustrated in the drawings, the rotary carrier for transferring the nuts from the hopper to the candy bars comprises end plates 10 and 11, a cylinder 12 mounted on the end plates, and a second cylindrical shell 13 mounted on the cylinder 12 and surrounding the cylinder.

The end plates 10 and 11 are flanged, as shown at 14 and 15, and the flanges are mounted on a hollow shaft 16 supported at one end in bearings 17 carried by a vertical frame 18. The outer end of the hollow shaft 16 has mounted therein a plug or stub shaft 20 having secured thereto a worm gear 21, which meshes with a worm 22 carried by a shaft 23 supported in brackets 24 and driven from any suitable source of power.

The other end of the hollow shaft 16 has fixedly mounted therein a sleeve 30, the inner end of the sleeve being closed by a plug or collar 31. The sleeve, as shown in Fig. 1, extends into the hollow shaft 16 to a position within the head or end plate 10 and the other end of the sleeve extends through the other end 32 of the hollow shaft 16 and is mounted to rotate in a bearing 33 mounted in a frame 34. Sealing washers 35 and 36 are carried by the bearing 33 and tightly engage the outer surface of the extending portion of the sleeve 30. The bearing 33 has an annular chamber 37 surrounding the sleeve 30 and the portion of the sleeve disposed within the chamber is provided with a plurality of openings or ports 38. A conduit 39 extends through the bearing and communicates with the annular chamber 37 and also has secured thereto a pipe 40 which is connected to a vacuum pump or other device for producing the vacuum.

A cam shaft 45 is mounted in a cylindrical plug 46 which closes the outer end of the sleeve 30 and at its opposite end the cam shaft is rotatably mounted in the plug 31. This shaft has a plurality of cams 47 mounted thereon for actuating the vacuum control means by which the vacuum within the sleeve 30 communicates with the pockets which receive and conduct the nuts from the hopper to the candy bars, as hereinafter explained.

The cylinder shell 13 has formed in its periphery, a plurality of annularly arranged sets of pockets 50. Each set, in the form of the invention shown, comprises a pair of pockets, as shown particularly in Figs. 2 and 3, and these pockets are spaced around the periphery of the drum in such a manner that the nuts carried thereby will be deposited on candy bars 51, two nuts being deposited on each bar. The candy bars 51 are conducted through the machine on an endless carrier 52 supported by rods 53 having on their outer end rollers 54 and 55 which are supported on rails 56 and 57. The rails 56 and 57 are flanged, as shown at 58 and 59, these flanges operating to properly center the endless carrier 52 relative to the nut carrying drum.

The pockets 50 and 50A of each pair of pockets communicate with bores 60 and 61 formed in the shell 13, and the bores 60 and 61 communicate through ports 62 and 63 with a chamber 64 which extends outwardly in the shell 13 between the pockets 50 and 50A, the outer end of the chamber 64 being closed. The inner end of each chamber 64 communicates with an enlarged chamber 65, which is formed partly in the inner portion of the shell 13 and partly in the outer portion of the cylinder 12. The cylinder 12 for each pair of pockets 50 and 50A has a bore 66 which communicates with the chamber 65 and is threaded at its inner end, as shown at 67. In the threaded portion 67 there is mounted a plug 68 and to the inner end of the plug is secured a sleeve 69. The other end of the sleeve 69 is secured to a plug 70, which is threaded at 71 to the hollow shaft 16.

A hollow tube 75 is slidably mounted in the bore 66 in cylinder 12 and in an opening 76 in the sleeve 30. This tube has secured to its outer end, a plate 77, which is disposed in the chamber 65 and has secured thereto and extending outwardly therefrom, pins 78 and 79 which are slidably mounted in the bores 60 and 61 in the shell 13. A spring 80 is disposed between the plate 77 and the inner end of the chamber 64. The spring tends to maintain the plate 77 and the pins 78 and 79 in the position shown in Figs. 2 and 3, in which position the ports 62 and 63 are open and establish communication between the pockets 50 and 50A and the chamber 64 and chamber 65.

A second spring 81 is secured within the sleeve 69 between a collar 82 mounted on the tube 75 and a washer 83 disposed at the outer end of the sleeve 69. This spring also forces the tube 75, plate 77 and pins 78 and 79 inwardly to the position shown in Figs. 2 and 3.

Figure 2:
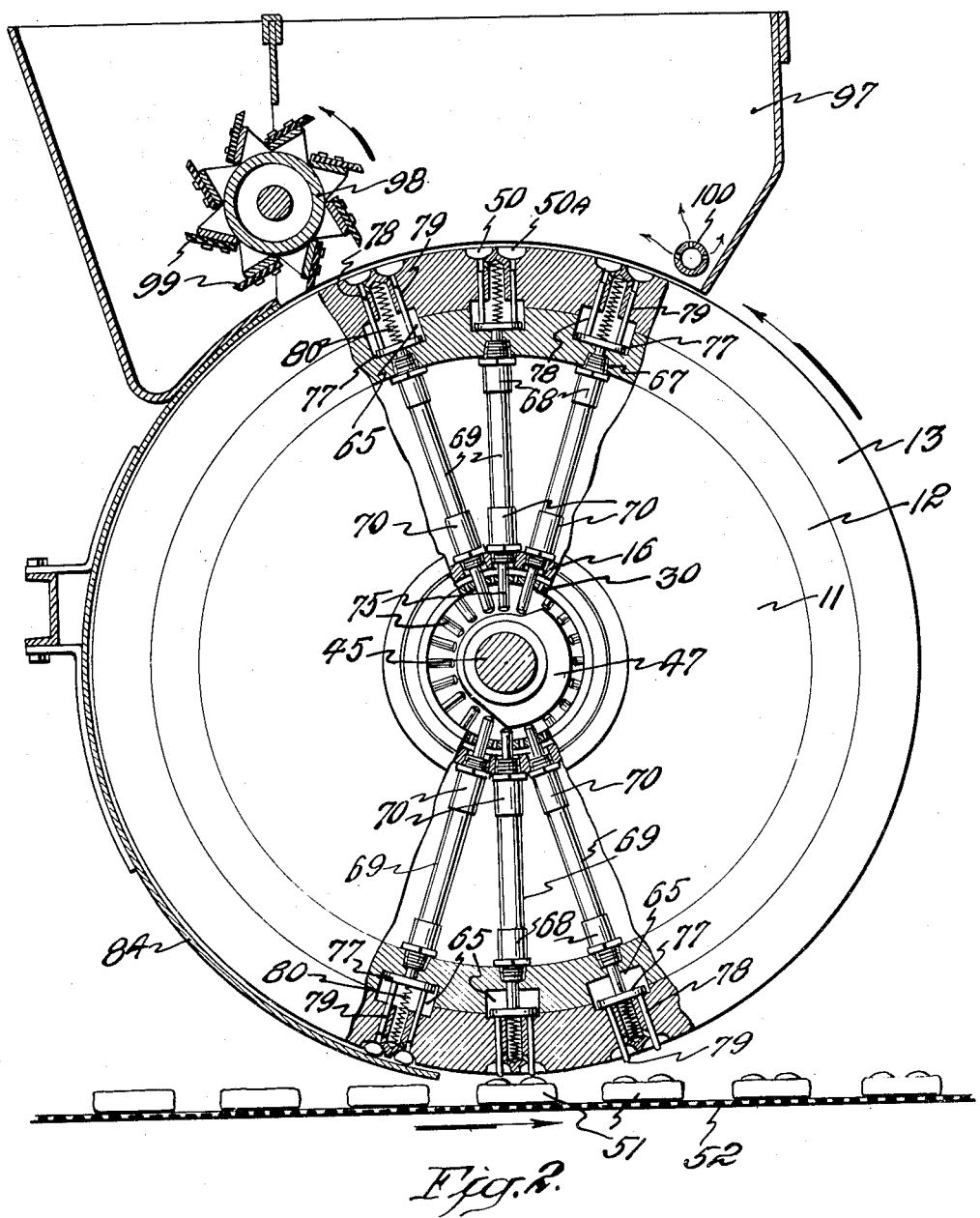
Fig. 2 is a transverse elevational view, partly in section, and taken substantially on line 2—2 of Fig. 1, looking in the direction of the arrows.

The plug 70 has a chamber 85 formed therein at the inner end of the sleeve 69 and this chamber communicates through a bore 86 with an annular groove 87 formed in the hollow shaft 16 at the inner end of each annular series of threaded bores 71, shown particularly in Figs. 2 and 3. Moreover, as shown in Fig. 4, the bore 86 has inwardly extending therein, lugs 88, which guide the tube 75 in its sliding movement. The tube 75 at the inner end portion thereof has formed therein a plurality of perforations or openings 89 which communicate with the sleeve 69, chamber 85 and bore 86.

The inner end of each tube 75 has secured therein and is closed by a plug 90 having a head 91 at its outer end.

The cams 47 which are mounted on the fixed shaft 45 are disposed in alinement with the annular series of pockets and each cam engages the head 91 at the inner end of the tube 75 and controls the position of this tube in the sleeve 69 and the positions of the pins 78 and 79. The cam shaft 45 can be angularly adjusted by means of an arm 92 secured to the outer end thereof and having a latching pin 93 slidably mounted in the end of the arm and engageable with any one of a plurality of openings 94 formed in the frame 34. The pin 93 is held in one of the openings by means of a spring 95 which engages a collar 96 on the pin 93 and at its other end engages the inner surface of the arm 92.

The rotary carrier for the nuts is mounted below a hopper 97 in which the nuts are positioned and in the hopper is rotatably mounted a hollow shaft or sleeve 98 having mounted on the periphery thereof a plurality of wiper blades 99 which operate to expedite the positioning of the nuts in the pockets 50 and 50A. The nuts in the hopper are agitated by means of an air blast which is conducted to the hopper through a pipe 100.

*Operation*

In the operation of the machine above described, the rotary carrier is rotated by the driving connections in the direction indicated by the arrow shown in Fig. 2 and the nuts in the hopper 97 will be sucked into the pockets 50 and 50A as the pockets pass beneath the hopper. During this portion of the cycle of the operation, the pockets will be connected to the vacuum in the sleeve 30, through the ports 60 and 61, chamber 64, chamber 65, tube 75, openings 89, chamber 85, bore 86, annular groove 87, and openings 101 in the sleeve 30. As the pockets pass from the hopper to the discharge position above the candy bars, the nuts are retained in the pockets by suction and also by a shield 84 which extends from the hopper to nut discharging position.

When the pockets reach discharging position above the candy bars 51, the cams 47 will force the tubes 75 outwardly, causing the pins 78 and 79 to close the ports 62 and 63 and cut off the vacuum from the pockets 50 and 50A. Furthermore, the outward movement of the pins 78 and 79 by engagement with the nuts in the pockets positively eject the nuts from the pockets and push them into the upper surfaces of the candy bars.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. In a machine of the character described having means for feeding a plurality of candy bars, a nut hopper having an opening in the bottom for the passage of nuts, a rotatable drum below the hopper and above the path of travel of the candy bars, said drum having in its periphery a plurality of pockets for receiving the nuts, said drum and pockets being movable beneath and in communication with the hopper opening, the improvement which consists of providing suction chambers in the drum communicating with said pockets, and a plurality of radially disposed suction pipes in said drum extending to the suction chambers for sucking the nuts into and holding the nuts in the pockets as the drum is rotated and the pockets move from receiving to discharging position above the candy bars.

2. In a machine of the character described having means for feeding a plurality of candy bars, a nut hopper having an opening in the bottom for the passage of nuts, a rotatable drum below the hopper and above the path of travel of the candy bars, said drum having in its periphery a plurality of pockets for receiving the nuts, said drum and pockets being movable beneath and in communication with the hopper opening, the improvement which consists of providing suction chambers in the drum communicating with said pockets, and a plurality of radially disposed suction pipes in said drum extending to the suction chambers for sucking the nuts into and holding the nuts in the pockets as the drum is rotated and the pockets move from receiving to discharging position above the candy bars, and vacuum control means for cutting off the vacuum from the pockets when the nuts and pockets reach discharging position.

3. In a machine of the character described having means for feeding a plurality of candy bars, a nut hopper having an opening in the bottom for the passage of the nuts, a rotatable drum below the hopper and above the path of travel of the candy bars, said drum having in its periphery a plurality of pockets for receiving the nuts, said drum and pockets being movable beneath and in communication with the hopper opening, the improvement which consists of providing suction chambers in the drum communicating with the pockets, suction pipes in the drum communicating with the suction chambers, and vacuum control means for cutting off communication between the chambers and pockets when the pockets reach discharging position.

4. In a machine of the character described having means for feeding a plurality of candy bars, a nut hopper having an opening in the bottom for the passage of nuts, a rotatable drum below the hopper and above the path of travel of the candy bars, said drum having in its periphery a plurality of pairs of pockets for receiving the nuts, said drum and pockets being movable beneath and in communication with the hopper opening, the improvement which consists of providing a hollow shaft in said drum, a plurality of tubes in the drum, each tube communicating at its outer end with a pair of pockets and at its inner end with the hollow shaft, an exhaust pipe connected to the hollow shaft, means connected to the tube for closing communication between the tube and the pockets, and means for actuating each tube to open and close said communication with the pockets.

5. In a machine of the character described having means for feeding a plurality of candy bars, a nut hopper having an opening in the bottom for the passage of nuts, a rotatable drum below the hopper and above the path of travel of the candy bars, said drum having in its periphery a plurality of pair of pockets for receiving the nuts, said drum and pockets being movable beneath and in communication with the hopper opening, the improvement which consists of providing a hollow shaft in said drum, a plurality of tubes in the drum, each tube communicating at its outer end with a pair of pockets and at its inner end with the hollow shaft, an exhaust pipe connected to the hollow shaft, means connected to the tube for closing communication between the tube and the pockets, and means for longitudinally moving each tube to open and close said communication with the pockets.

6. In a machine of the character described having means for feeding a plurality of candy bars, a nut hopper having an opening in the bottom for the passage of nuts, a rotatable drum below the hopper and above the path of travel of the candy bars, said drum having in its periphery a plurality of pairs of pockets for receiving the nuts, said drum and pockets being movable beneath and in communication with the hopper opening, the improvement which consists of providing a hollow shaft in said drum, a plurality of tubes in the drum, each tube communicating at its outer end with a pair of pockets and at its inner end with the hollow shaft, an exhaust pipe connected to the hollow shaft, means connected to the tube for closing communication between the tube and the pockets, and cam means in said hollow shaft for longitudinally moving each tube to open and close said communication with the pockets.

7. In a machine having a carrier for supporting and moving candy bars, means for transferring nuts from a hopper to said bars comprising a drum having a shell provided with a plurality of annular series of pockets, said shell having a chamber communicating with each pocket, a suction tube connected to the shell and extending inwardly from each pocket, and means carried by each tube for closing the communication from each chamber to its pocket.

8. In a machine having a carrier for supporting and moving candy bars, means for transferring nuts from a hopper to said bars comprising a drum having a shell provided with a plurality of annular series of pockets, said shell having a chamber communicating with each pocket, a suction tube connected to the shell slidably mounted therein and extending inwardly from each pocket, and means carried by each tube for closing the communication from each chamber to its pocket.

LOUIS H. ZEUN.

REFERENCES CITED

The following references are of record in the file of this patent:

UNITED STATES PATENTS

| Number | Name | Date |
|---|---|---|
| 1,579,407 | Smith | Apr. 6, 1926 |
| 1,763,084 | Bausman | June 10, 1930 |
| 1,762,671 | Slathar | June 10, 1930 |
| 1,786,108 | Drury | Dec. 23, 1930 |
| 2,002,018 | Martoccio | May 21, 1935 |